(12) United States Patent
Takamoto (10) Patent No.: US 9,542,676 B2
(45) Date of Patent: Jan. 10, 2017

(54) HOST DEVICE, PRINTING SYSTEM, AND DATA PROCESSING METHOD

(71) Applicant: Seiko Epson Corporation, Tokyo (JP)

(72) Inventor: Akio Takamoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/921,461

(22) Filed: Oct. 23, 2015

(65) Prior Publication Data

US 2016/0139865 A1 May 19, 2016

(30) Foreign Application Priority Data

Nov. 13, 2014 (JP) .................................. 2014-230434
Nov. 13, 2014 (JP) .................................. 2014-230435

(51) Int. Cl.
*G06F 3/12* (2006.01)
*G06Q 20/20* (2012.01)
*G06K 15/02* (2006.01)

(52) U.S. Cl.
CPC .......... *G06Q 20/209* (2013.01); *G06F 3/1204* (2013.01); *G06F 3/1244* (2013.01); *G06F 3/1285* (2013.01); *G06K 15/1836* (2013.01)

(58) Field of Classification Search
None
See application file for complete search history.

(56) References Cited

U.S. PATENT DOCUMENTS

| | | | | |
|---|---|---|---|---|
| 7,131,067 B1 * | 10/2006 | Ikeda | .................. | G06K 15/007 358/1.15 |
| 7,180,630 B2 * | 2/2007 | Watanabe | .......... | G06K 15/1822 358/1.16 |
| 7,375,844 B2 * | 5/2008 | Kitahara | ............... | G06F 17/243 358/1.16 |
| 7,656,553 B2 * | 2/2010 | Ahmad | ................ | G06F 3/1204 347/5 |
| 8,237,971 B2 * | 8/2012 | Otsuka | .................. | G06K 15/00 358/1.15 |
| 8,289,566 B2 * | 10/2012 | Yokoyama | ............. | H04N 1/644 358/1.12 |
| 9,135,534 B2 * | 9/2015 | Takamoto | .......... | G06K 15/1822 |
| 2009/0237717 A1 * | 9/2009 | Takamoto | ............... | G06F 3/121 358/1.15 |
| 2011/0161711 A1 * | 6/2011 | Takamoto | ............. | G06F 1/3228 713/324 |
| 2012/0057204 A1 * | 3/2012 | Mizoguchi | ............ | G06F 3/1208 358/1.15 |
| 2012/0069404 A1 * | 3/2012 | Kodama | ............. | G06F 3/1206 358/1.18 |
| 2012/0274961 A1 * | 11/2012 | Makabe | ............. | G06K 15/1825 358/1.11 |

FOREIGN PATENT DOCUMENTS

JP  2014-085741 A  5/2014
JP  2014-085742 A  5/2014

* cited by examiner

*Primary Examiner* — Dung Tran
(74) *Attorney, Agent, or Firm* — Nutter McClennen & Fish LLP (57) ABSTRACT

Text data is acquired from print request data, print content is expressed as raster data and print data is generated using a printer command based on the print request data, the acquired text data is added to the print data using the command, and the print data is sent with the text data to the printer.

17 Claims, 10 Drawing Sheets

HOST DEVICE, PRINTING SYSTEM, AND DATA PROCESSING METHOD

Priority is claimed under 35 U.S.C. §119 to Japanese Application nos. 2014-230434 filed Nov. 13, 2014 and 2014-230435 filed Nov. 13, 2014 are hereby incorporated by reference in their entirety.

BACKGROUND

1. Technical Field

The present disclosure relates to a host device of a printer, a, and relates more particularly to a host device, a printing system, and a data processing method that can easily extract information from print data.

The disclosure also relates to a host device, a printing system, and a data processing method that can easily extract information from print data without changing the existing application, driver, or printout.

2. Related Art

POS systems, which are a type of sales management system, are commonly used in supermarkets and other retail businesses, and multiple terminal devices (such as electronic cash registers) in the system operate and execute processes as controlled by applications installed on the terminal devices. A printer is also typically connected to each terminal device, and produces receipts, coupons, and other printouts as instructed by the application. Systems that are configured similarly to a POS system and produce other types of printouts are also used in hospitals and package delivery companies.

As technology advances and business needs change after the system is initially deployed, adding new functions becomes necessary. Adding functions for analyzing sales information and producing electronic receipts, for example, is particularly desirable in POS systems.

Such systems are typically central to business operations and are connected to other systems, and changing the applications used in a system is normally not easy.

To solve this problem, JP-A-2014-85741 describes technology enabling processing and supplying data output by the POS terminal to another external device.

Many terminal devices that command printing receipts and other forms in a POS system, for example, use a Windows® driver as the printer driver, and the object to be printed is converted by the printer driver to raster data that is then sent to the printer.

When a Windows driver is used by the POS terminal applying the method described in JP-A-2014-85741, the data processing device that extracts information from the print data must use OCR (optical character recognition) technology, for example, to extract meaning from the rasterized print data (such as text). This creates problems with the accuracy of the information and increases the load on the data processor.

Some problems with information acquisition can be resolved by switching to a mode that sends text data from the POS terminal device to the printer, but this requires using the fonts built into the printer when printing and the appearance of the printout may change.

SUMMARY

An objective of the present disclosure is to provide a host device, a printing system, and a data processing method enabling easily extracting information from print data even when the print data is output as raster data from the host device.

If the printer driver is also updated to add such new functionality, the appearance of the printout may change from the previous output when the existing driver used special functions.

A further objective of the disclosure is therefore to provide a host device, a printing system, and a data processing method that can easily extract information from print data without changing the existing application, driver, or the appearance of the final printout.

One aspect of the disclosure is a host device including: an acquisition unit that acquires text data from print request data; a printer driver unit that rasterizes print content and generates print data using a printer command based on the print request data; and a merging unit that adds the acquired text data to the print data using the command, and sends the print data with the added text data to the printer.

Preferably, the acquisition unit receives the print request data before the printer driver unit, extracts the text data to be printed from the print request data, and sends the print request data to the printer driver unit; and the merging unit receives the print data the printer driver unit outputs based on the print request data, adds the acquired text data to the print data using a command of the print data, and sends the print data with the added text data to the printer.

Further preferably, print content is expressed by raster data in the print data that the printer driver unit outputs.

Yet further preferably, the merging unit executes a process of sorting the acquired text data into the order the text data appears when printed before adding the text data to the print data.

In another aspect of the disclosure, the merging unit adds the acquired text data to the print data by inserting the text data between a registration command setting a page mode in which the printer buffers the print data for a specific printing area before executing the printing process based on the buffered print data, and a cancel command that cancels printing in the page mode.

In another aspect of the disclosure, the merging unit adds text data to the print data using a start command for a text mode that sends the print data to the printer as text data, and a specific number of characters of text data followed by a clear command.

Another aspect of the disclosure is a printing system comprising a printer and a host device of the printer. The host device includes an acquisition unit that acquires text data from print request data; a printer driver unit that rasterizes print content and generates print data using a printer command based on the print request data; and a merging unit that adds the acquired text data to the print data using the command, and sends the print data with the added text data to the printer. The printer includes a text data processing unit that acquires the added text data from the transmitted print data, and a print unit that executes a printing process based on the print data.

Preferably, the acquisition unit of the host device receives the print request data before the printer driver unit, extracts the text data to be printed from the print request data, and sends the print request data to the printer driver unit, and the merging unit of the host device receives the print data the printer driver unit outputs based on the print request data, adds the acquired text data to the print data using a command of the print data, and sends the print data with the added text data to the printer. The text data processing unit of the printer acquires the added text data from the transmitted print data, and the print unit of the printer executes a printing process based on the print data.

Further preferably, the text data processing unit stores the acquired text data, and sends the text data at a specific time to another device.

Yet further preferably, print content is expressed by raster data in the print data output by the printer driver unit.

Yet further preferably, the merging unit of the host device sorts the acquired text data into the order the text data appears when printed, and adds the sorted text data to the print data.

In another aspect of the disclosure, the merging unit of the host device adds the acquired text data to the print data by inserting the text data between a registration command setting a page mode in which the printer buffers the print data for a specific printing area before executing the printing process based on the buffered print data, and a cancel command that cancels printing in the page mode.

In another aspect of the disclosure, the merging unit of the host device adds text data to the print data using a start command for a text mode that sends the print data to the printer as text data, and a specific number of characters of text data followed by a clear command.

Another aspect of the disclosure is a data processing method of a host device, the data processing method including: an acquisition step of acquiring text data from print request data; a print data generating step of rasterizing print content and generating print data using a command for a printer based on the print request data; an adding step of adding the acquired text data to the print data using the command; and a transmission step of sending the print data with added text data to the printer.

Further preferably in this data processing method, the acquisition step receives the print request data before a printer driver unit, extracts text data to be printed from the print request data, and sends the print request data to the printer driver unit; and the adding step receives the print data the printer driver unit outputs based on the print request data, adds the text data acquired in the acquisition step to the print data using a command of the print data, and sends the print data with the added text data to the printer.

Further preferably in this data processing method, print content is expressed by raster data in the print data that the printer driver unit outputs.

Yet further preferably, the adding step sorts the text data into the order the text data appears when printed before adding the text data to the print data.

In another aspect of this data processing method, the adding step adds the acquired text data to the print data by inserting the text data between a registration command setting a page mode in which the printer buffers the print data for a specific printing area before executing the printing process based on the buffered print data, and a cancel command that cancels printing in the page mode.

In another aspect of this data processing method, the adding step adds text data to the print data using a start command for a text mode that sends the print data to the printer as text data, and a specific number of characters of text data followed by a clear command.

To achieve the foregoing objective, another aspect of the disclosure is a driver program that causes the host computer of a printer to execute steps including: an acquisition step of acquiring text data from received print request data; a print data generating step of rasterizing print content and generating print data using a command for the printer based on the print request data; an adding step of adding the acquired text data to the print data using the command; and a transmission step of sending the print data with added text data to the printer.

Further preferably in this aspect of the disclosure, the adding step sorts the acquired text data into the order the text data appears when printed before adding the text data to the print data.

Further preferably in this aspect of the disclosure, adding text data to the print data in the adding step is done by inserting the acquired text data between a registration command setting a page mode in which the printer buffers the print data for a specific printing area before executing the printing process based on the buffered print data, and a cancel command that cancels printing in the page mode.

Further preferably in this aspect of the disclosure, adding text data to the print data in the adding step is done by adding the text data to the print data using a start command for a text mode that sends the print data to the printer as text data, and a specific number of characters of text data followed by a clear command.

Another aspect of the disclosure is a printing system comprising a printer and a host device of the printer.

The host device has a printer driver unit that acquires text data from received print request data; rasterizes the print content and generates print data using a printer command based on the print request data; adds the acquired text data to the print data using the command; and sends the print data with the added text data to the printer.

The printer includes a text data processing unit that acquires the added text data from the transmitted print data, and a print unit that executes a printing process based on the print data.

Preferably, the text data processing unit stores the acquired text data, and sends the text data at a specific time to another device.

Another aspect of the disclosure is a data processing method of a host computer of a printer, the data processing method including: an acquisition step of acquiring text data from received print request data; a print data generating step of rasterizing print content and generating print data using a command for the printer based on the print request data; an adding step of adding the acquired text data to the print data using the command; and a transmission step of sending the print data with added text data to the printer.

Other objects and attainments together with a fuller understanding of the disclosure will become apparent and appreciated by referring to the following description and claims taken in conjunction with the accompanying drawings.

BRIEF DESCRIPTION OF THE DRAWINGS

FIG. 7 is a flow chart describing steps in a process executed by the filter driver unit 12a and command merging unit 14a.

FIG. 9 is a flow chart describing steps in a process executed by the text data processing unit 21a.

FIG. 10 is a flow chart describing steps in a process executed by the print control unit 22a and print mechanism unit 23a.

DESCRIPTION OF EMBODIMENTS

Preferred embodiments of the present disclosure are described below with reference to the accompanying figures. The embodiments described below do not, however, limit the technical scope of the disclosure. Note also that like or similar parts are identified in the following figures by the same reference numerals or symbols.

Embodiment 1

Figure 1:
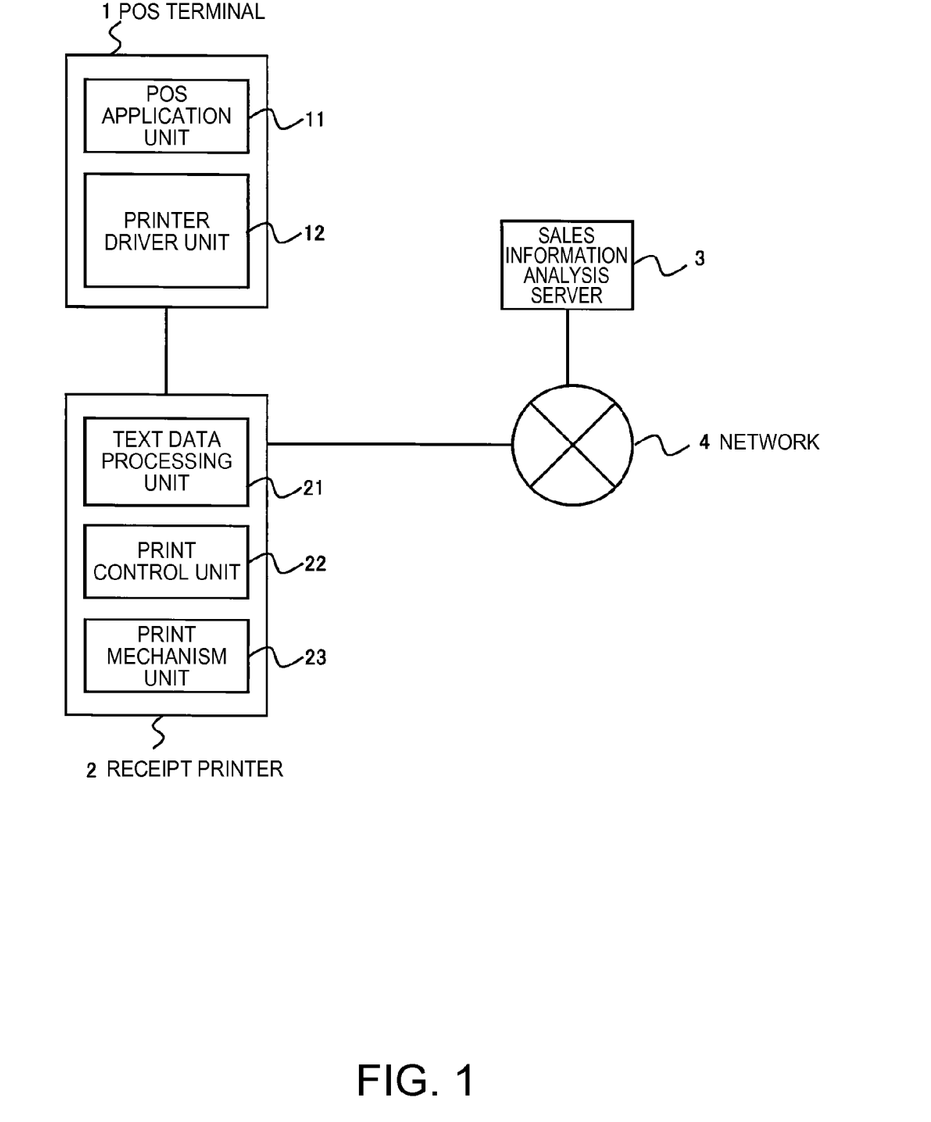
FIG. 1 illustrates the configuration of a printing system according to a first embodiment of the disclosure.

FIG. 1 illustrates the configuration of a printing system according to a first embodiment of the disclosure. When a print request is output from the POS application unit 11 of the POS (point-of-sale) terminal 1 shown in FIG. 1, the printer driver unit 12 rasterizes the print object and generates print data expressed by commands for the receipt printer 2. To do this, the printer driver unit 12 extracts the text data to be printed from the print request, and adds the text data to the generated print data using a specific command. As a result, the receipt printer 2 that receives the print data can easily acquire sales information from the print data of the receipt by extracting the text data that was added.

Note that raster data is data expressing the object to be printed with a gray scale value of each color for each pixel in the printed image.

As shown in FIG. 1, the printing system according to this embodiment has a POS terminal 1 and a receipt printer 2, and the receipt printer 2 is connected to a sales information analysis server 3 through the Internet or other network 4.

The POS terminal 1 is a terminal device of a POS system used at a checkout counter in a supermarket, for example, and is communicatively connected to a receipt printer 2. The POS terminal 1 is a host device of the receipt printer 2, and instructs the receipt printer 2 to produce a receipt or coupon, for example, when processing a sale transaction (at the time of payment). The POS terminal 1 is a computer, and while not shown in the figure includes a CPU, RAM, ROM, hard disk drive, and other peripheral devices such as a display, keyboard, barcode reader, and card reader not shown.

As shown in FIG. 1, the POS terminal 1 has a POS application unit 11 and a printer driver unit 12 as functional components.

The POS application unit 11 runs the transaction process at the point of sale, and sends data including receipt and coupon print requests to a POS server not shown. When requesting printing, the POS application unit 11 outputs the print request data to the printer driver unit 12. The print request data is expressed by standard commands, and in this example is expressed in the GDI (Graphics Device Interface) language.

The printer driver unit 12 handles driver functions for the receipt printer 2. The printer driver unit 12 receives print request data output from the POS application unit 11, and generates and sends print data in the command language of the receipt printer 2 based on the print request data to the receipt printer 2. As described above, when generating the print request data, the printer driver unit 12 executes a process that adds text data to the print data. This process is a major feature of the printing system according to the disclosure, and is described in detail below.

The POS application unit 11 and printer driver unit 12 are embodied by programs (a POS application program and printer driver program) defining the steps in the processes, a CPU that executes the programs, and RAM or other memory device, for example.

The receipt printer 2 is a printer that prints receipts, coupons, or other objects as instructed by the POS terminal 1. The printing method may be inkjet, thermal, or other printing method. The receipt printer 2 prints the print objects on roll paper, for example, and cuts the paper with a cutter after printing is completed.

The receipt printer 2a is an intelligent printer in this example, and, in addition to a print control unit as used in a typical printer, includes a data processing device (computing device) similar to a personal computer.

Functional components of the receipt printer 2 include, as shown in FIG. 1, a text data processing unit 21, print control unit 22, and print mechanism unit 23 (the print control unit 22 and print mechanism unit 23 embodying a print unit).

The text data processing unit 21 is embodied by the data processing device described above, that is, a CPU, ROM, RAM, hard disk drive, and other peripheral components, and a program defining the process content. The text data processing unit 21 receives print data sent from the POS terminal 1, and executes processes to extract text data from the print data, and send the acquired text data to the sales information analysis server 3.

The print control unit 22 is the control unit of the printer, and controls the printing process based on the received print data. The print control unit 22 is embodied by a program and a CPU, ROM, RAM, ASIC, and NVRAM, for example.

The print mechanism unit 23 operates as controlled by the print control unit 22, and prints on paper. The print mechanism unit 23 includes a printhead, print media conveyance device, and cutter, for example.

The sales information analysis server 3 is a server computer that receives the text data sent from the receipt printer 2, and uses the received text data to execute a sales analysis process and electronic receipt issuing process.

In the sales analysis process, information such as the names, quantities, and prices of the purchased products, the store where the products were purchased, the date of sale, and the total purchase amount that is printed on the receipt are acquired from the text data, and used to analyze variations in sales based on the time of day, seasonal variations, and regional (location) variations, for example. Because essential information printed on the receipt is extracted from the text data in the electronic receipt issuing process, a screen showing the content of the requested receipt can be provided to the terminal device in response to user access from the terminal device.

Figure 2:
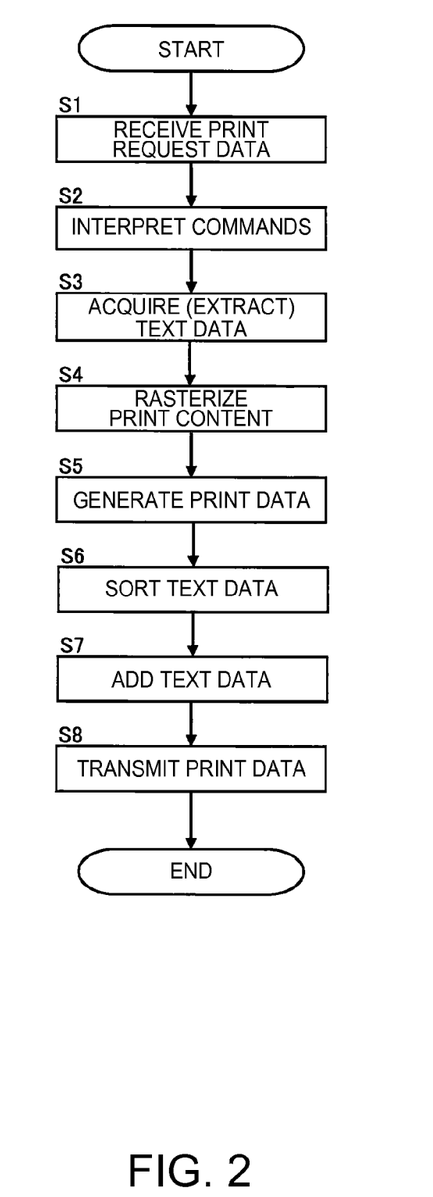
FIG. 2 is a flow chart describing steps in a process executed by the printer driver unit 12.

The processes described below are executed when printing a receipt is requested in the printing system according to this embodiment of the disclosure. FIG. 2 is a flow chart showing steps in the process executed by the printer driver unit 12. As described above, when printing a receipt is requested, print request data is output from the POS application unit 11. The printer driver unit 12 then receives the print request data (step S1 in FIG. 2) and sequentially interprets the content (step S2 in FIG. 2).

As described above, the print request data is expressed according to the GDI specification, and the print objects contained in the receipt requested to be printed is represented by a GDI function. Text expressing the store name and product names, numbers expressing numerical information such as prices, and images expressing a store logo, for example, are contained in the print objects.

The printer driver unit 12 sequentially interprets the GDI functions in the print request data and builds an image of the print objects (an image expressed by pixels), that is, executes a process that creates an image, but when the print object is text data comprising characters and numbers, acquires (extracts) the text data (step S3 in FIG. 2) and then builds the image. The printer driver unit 12 stores the acquired text data in memory.

When the text data acquisition process (step S3 in FIG. 2) and imaging process (step S4 in FIG. 2) are completed, the printer driver unit 12 generates print data expressing the imaged print content in the command language of the receipt printer 2 and instructing the receipt printer 2 to print (step S5 in FIG. 2). Because the print content instructed by the print data is an image, or more specifically is raster data, recognizing the objects to be printed is difficult from the image data alone.

The printer driver unit 12 then executes a process to reorder the acquired text data (step S6 in FIG. 2). Because the print objects of text data contained in the print request data are not necessarily in the order in which they are printed, that is, are not necessarily in the top to bottom order of the receipt, the printer driver unit 12 rearranges the acquired text data into the order in which it appears on the receipt in the reordering process.

More specifically, because the print objects for text data expressed by GDI functions contain information identifying where to print the objects, the printer driver unit 12 sorts the text data representing the print objects into the order the objects appear on the receipt. Yet more specifically, the printer driver unit 12 first sorts the text data vertically starting from the top of the receipt to the bottom, and then sorts any objects at the same vertical (lengthwise) position from left to right on the receipt.

Next, the printer driver unit 12 executes a process that adds the sorted text data to the generated print data (step S7 in FIG. 2). In this process, the printer driver unit 12 adds the text data to the print data using the command language of the receipt printer 2 so that the print data can be understood (interpreted) by the print control unit 22 of the receipt printer 2 and the text data is not printed by the receipt printer 2.

More specifically, in one example, this process of adding the text data can be done using page mode commands. Because the print objects contained in the print data are normally expressed by raster data as described above, the receipt printer 2 prints the received raster data sequentially and does not store the data. However, in the page mode, the data for the print objects in a specific area (such as one page or one receipt) are stored (buffered) to memory in the receipt printer 2 and then used to print that area (page or receipt). The print objects also do not need to be expressed by raster data in the page mode, and may be text data. Also in the page mode, commands are written in the print data starting with a page mode registration command (start page mode command), followed by the data for the print objects, and commands for executing the printing process.

In this example, page mode commands are used to add a page mode registration command, the resorted text data acquired as described above, and a cancel command sequentially to the print data generated as described above.

Figure 3:
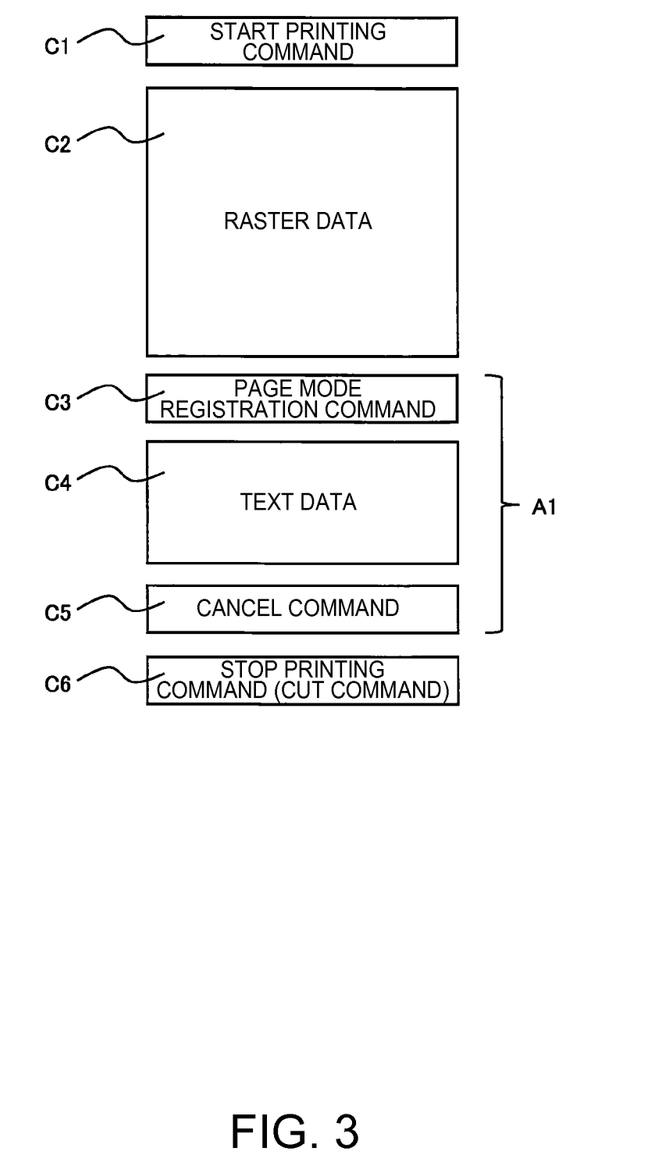
FIG. 3 conceptually illustrates the structure of print data in the first embodiment of the disclosure.

FIG. 3 illustrates the conceptual structure of the print data. FIG. 3 shows an example of the print data that is generated by the printer driver unit 12 and sent to the receipt printer 2, and is the data for one receipt. In FIG. 3, reference numeral C2 indicates the rasterized image data of the print content, and the start printing command C1 is the raster data header and includes the amount of raster data (the number of bytes). The end printing command C6 is a command instructing ending printing, and in this example is a cut command. These objects C1, C2, and C6 are print data generated by the print data generating step (S5) described above.

The block identified by reference numeral A1 in FIG. 3 is the part added by the process in step S7 described above, and includes the page mode registration command (C3), the resorted text data (C4), and the cancel command (C5).

Note that other commands may be used to add text data. For example, in the text mode, text data may be added using text data of a character count not exceeding the printing width, and a clear command. More specifically, the printer driver unit 12 first adds a start text mode command between the raster data of the generated print data (C2 in FIG. 3) and the cut command (C6 in FIG. 3). Next, the printer driver unit 12 determines the number of characters can fit on one line within the printing width, sequentially extracts and adds this number of characters of text data from the resorted text data to the print data, and then adds a clear command. This number of characters of text data and clear commands are repeatedly added until there is no more text data.

When this addition process ends, the printer driver unit 12 sends the print data with the added data to the receipt printer 2 (step S8 in FIG. 2).

This completes processing by the printer driver unit 12.

Figure 4:
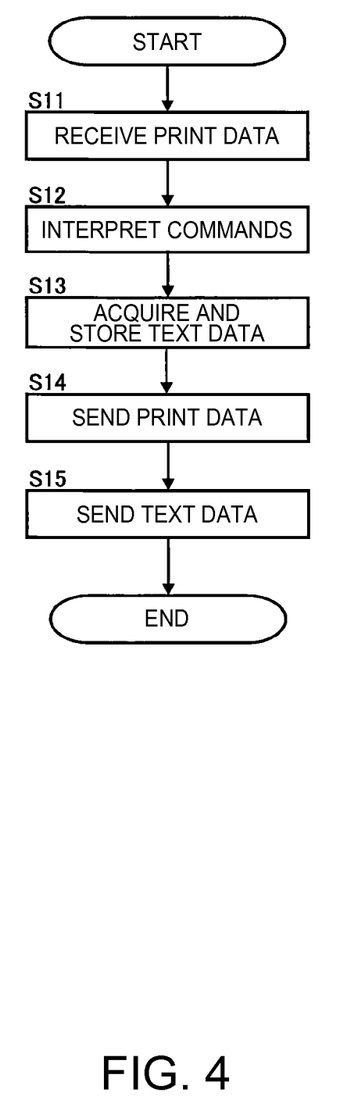
FIG. 4 is a flow chart describing steps in a process executed by the text data processing unit 21.

The process executed by the text data processing unit 21 of the receipt printer 2 is described next. FIG. 4 is a flow chart showing steps in the process executed by the text data processing unit 21.

The text data processing unit 21 first receives the print data sent from the printer driver unit 12 (step S11 in FIG. 4), and sequentially interprets the commands contained in the print data (step S12 in FIG. 4).

If the text data processing unit 21 determines by this process that there is no text data, it outputs the print data directly to the print control unit 22 (step S14 in FIG. 4). However, if there is text data, the text data processing unit 21 acquires and stores the text data in memory (step S13 in FIG. 4), and then sends that portion of print data to the print control unit 22 (step S14 in FIG. 4).

Using the example of print data shown in FIG. 3, the text data in block C4 is acquired and stored, and all of the print data (C1 to C6) is sent to the print control unit 22.

In the above example that uses a text mode and adds a specific number of text data objects and clear commands, the text data portion is extracted and stored, and all of the print data is sent to the print control unit 22.

Alternatively, after acquiring and storing the text data, the text data processing unit 21 may delete the text data portion from the print data, and then send the remaining print data to the print control unit 22. In this event, the portion added by the text data adding process is deleted.

When acquiring and storing the text data (S13) and sending the received print data (S14) are completed, the text data processing unit 21 sends the stored text data to the sales information analysis server 3 (step S15 in FIG. 4). To send the data, the text data processing unit 21 may first convert the stored text data to markup language (such as XML (Extensible Markup Language)) before sending the data. The data may also be sent to the sales information analysis server 3 at the desirable frequency, such as every time a receipt is printed or by daily or weekly units.

Because the sales information printed on the receipts is included in the transmitted text data, the sales information analysis server 3 can execute processes to analyze the information or issue electronic receipts.

This completes processing by the text data processing unit 21.

Figure 5:
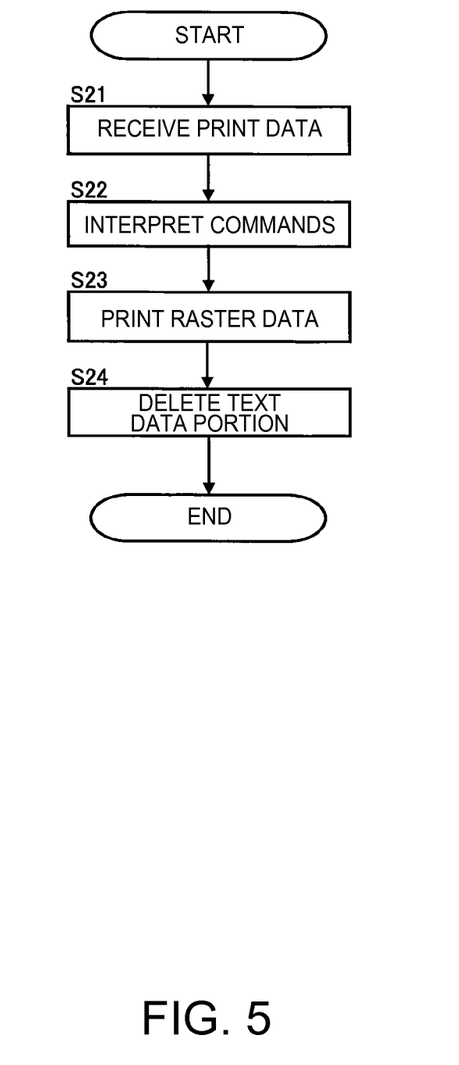
FIG. 5 is a flow chart describing steps in a process executed by the print control unit 22 and print mechanism unit 23.

The process executed by the print control unit 22 and print mechanism unit 23 is described next. FIG. 5 is a flow chart showing steps in the process executed by the print control unit 22 and print mechanism unit 23.

The print data transmitted from the text data processing unit 21 is first received by the print control unit 22 (step S21 in FIG. 5), and the print control unit 22 then sequentially interprets the commands contained in the received print data (step S22 in FIG. 5).

The print control unit 22 controls the print mechanism unit 23 based on the interpreted commands, and controls the print mechanism unit 23 to print on the paper (step S23 in FIG. 5). As described above, the print control unit 22 sequentially passes the received raster data to the print mechanism unit 23 for printing based on the raster data.

The text data that was added by the text data adding step is then deleted by the command added after the text data, and is not printed by the print mechanism unit 23 (step S24 in FIG. 5).

In the print data shown in FIG. 3, printing proceeds through the raster data C2, and the text data C4 is deleted from memory by the cancel command in C5 and is not printed.

In the above example that adds a specific amount of text data and a clear command using a text mode, the specific amount of text data is deleted by the immediately following clear command and is not printed.

Only the portion that should be printed as a receipt is therefore printed, and the data that is added for acquiring the sales information is not printed. When the added text data is deleted by the text data processing unit 21, only the portion that should be printed as a receipt is printed.

Processing by the print control unit 22 and print mechanism unit 23 thus ends.

Because the text portion added to the print data by the adding process described above is expressed by commands that can be interpreted by the receipt printer 2 and is processed without affecting the printing process, the receipt printer 2 can print receipts without throwing an error even if the receipt printer 2 is not a so-called intelligent printer and does not have the portion corresponding to the text data processing unit 21.

As described above, because the printer driver unit 12 in the printing system according to this embodiment adds text data for the information printed on the receipt to the print data and sends the combined text data and print data to the receipt printer 2, the printer can easily extract the information printed on the receipt even if the print objects are rasterized by the host.

Furthermore, because the printer driver unit 12 acquires the text data added to the print data before the print objects are rasterized, processing is simple and information can be accurately acquired.

Furthermore, the existing POS application does not need to be modified to add the ability to extract information from receipt data to an existing system because this functionality can be added by adding a function for adding text data to the printer driver unit 12 and adding a data acquisition function to the text data processing unit 21.

Because the process of rasterizing print objects on the host side in an existing system does not change, the resulting printout also does not change.

Furthermore, because the printer driver unit 12 sorts and adds text data in the order the data appears on the receipt, the text data can be easily used by the sales information analysis server 3, for example.

Furthermore, because the printer driver unit 12 uses commands for the receipt printer 2 to add text data to the print data, the commands can be easily interpreted by the receipt printer 2 and the print control unit 22 does not return an error.

A POS system is used as an example in the embodiment described above, but the disclosure is not so limited to use in POS systems. For example, the disclosure can be used in systems that execute a specific application including producing printouts from a printer, such as systems used in hospitals and package delivery companies, and is particularly effective when modifying the existing application program is difficult.

Embodiment 2

Figure 6:
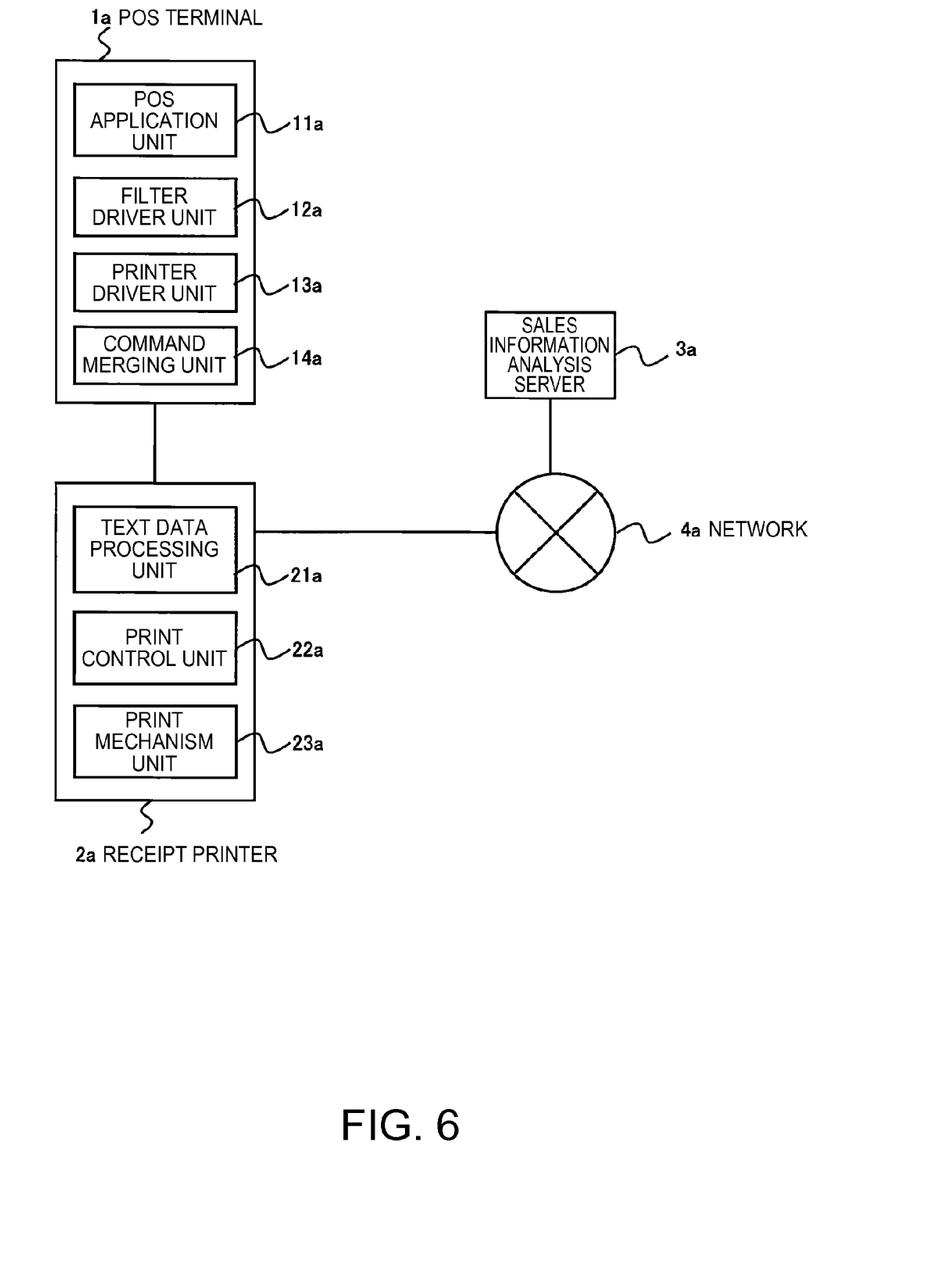
FIG. 6 illustrates the configuration of a printing system according to a second embodiment of the disclosure.

FIG. 6 illustrates the configuration of a printing system according to a second embodiment of the disclosure. When print request data is output from the POS application unit 11a of the POS (point-of-sale) terminal 1 shown in FIG. 6, the filter driver unit 12a receives the print request data before it is received by the printer driver unit 13a, and acquires the text data to be printed from the print request data. A command merging unit 14a then executes a process to add the acquired text data to the print data for the receipt printer 2a generated by the printer driver unit 13a based on the print request data, and sends the resulting print data to the receipt printer 2a. As a result, the receipt printer 2a that receives the print data can easily acquire sales information from the print data of the receipt by extracting the text data that was added.

A sales information analysis function can therefore be easily added to an existing POS system without needing to modify the existing POS application or printer driver, and the resulting printouts will also not change.

As shown in FIG. 6, the printing system according to this embodiment has a POS terminal 1a and a receipt printer 2a, and the receipt printer 2a is connected to a sales information analysis server 3a through the Internet or other network 4a.

The POS terminal 1a is a terminal device of a POS system used at a checkout counter in a supermarket, for example, and is communicatively connected to a receipt printer 2a. The POS terminal 1a is a host device of the receipt printer 2a (print control device), and instructs the receipt printer 2a to produce a receipt or coupon, for example, when processing a sale transaction (at the time of payment). The POS terminal 1a is a computer, and while not shown in the figure includes a CPU, RAM, ROM, hard disk drive, and other peripheral devices such as a display, keyboard, barcode reader, and card reader not shown.

As shown in FIG. 6, the POS terminal 1a has a POS application unit 11a, a filter driver unit 12a, a printer driver unit 13a, and a command merging unit 14a as functional components.

The POS application unit 11a runs the transaction process at the point of sale, and sends data including receipt and coupon print requests to a POS server not shown. When requesting printing, the POS application unit 11a outputs the print request data to the printer driver unit 13a. The print request data is expressed by standard commands, and in this example is written in the GDI (Graphics Device Interface) language.

Note that the POS application unit 11a resides on the application layer of the computer used as the POS terminal 1a, and is embodied by programs defining the steps in the processes, a CPU that executes the programs, and RAM or other memory device, for example.

The filter driver unit 12a (acquisition unit) receives the print request data output from the POS application unit 11a to the printer driver unit 13a before the printer driver unit 13a receives the data, and extracts the text data to be printed from the print request data. The filter driver unit 12a resides on the kernel layer of the operating system of the computer used as the POS terminal 1a, and is embodied by a program defining the steps of the is process, a CPU that executes the program, and RAM or other memory device, for example.

The printer driver unit 13a handles the receipt printer 2a driver function. The printer driver unit 13a receives print request data output from the POS application unit 11a, and generates and sends print data in the command language of the receipt printer 2a based on the print request data to the receipt printer 2a. The printer driver unit 13a rasterizes the print objects (content to be printed) contained in the print request data, and includes the raster data in the print data.

The raster data is data expressing the object to be printed with a gray scale value of each color for each pixel in the printed image.

Note that the printer driver unit 13a resides on the application layer of the computer used as the POS terminal 1a, and is embodied by a driver program, a CPU that executes the program, and RAM or other memory device, for example.

The command merging unit 14a (merging unit) runs a process adds the text data acquired by the filter driver unit 12a to the print data generated by the printer driver unit 13a. This process is described further below. Note that the command merging unit 14a resides on the application layer of the computer used as the POS terminal 1a, and is embodied by a program defining the process, a CPU that executes the program, and RAM or other memory device, for example.

The receipt printer 2a is a printer that prints receipts, coupons, or other objects as instructed by the POS terminal 1a. The printing method may be inkjet, thermal, or other printing method. The receipt printer 2a prints the print objects on roll paper, for example, and cuts the paper with a cutter after printing is completed.

The receipt printer 2a is an intelligent printer in this example, and, in addition to a print control unit as used in a typical printer, includes a data processing device (computing device) similar to a personal computer.

Functional components of the receipt printer 2a include, as shown in FIG. 6, a text data processing unit 21a, print control unit 22a, and print mechanism unit 23a (the print control unit 22a and print mechanism unit 23a embodying a print unit).

The text data processing unit 21a is embodied by the data processing device described above, that is, a CPU, ROM, RAM, hard disk drive, and other peripheral components, and a program defining the process content. The text data processing unit 21a receives print data sent from the POS terminal 1a, and executes processes to extract text data from the print data, and send the acquired text data to the sales information analysis server 3a.

The print control unit 22a is the control unit of the printer, and controls the printing process based on the received print data. The print control unit 22a is embodied by a program and a CPU, ROM, RAM, ASIC, and NVRAM, for example.

The print mechanism unit 23a operates as controlled by the print control unit 22a, and prints on paper. The print mechanism unit 23a includes a printhead, print media conveyance device, and cutter, for example.

The sales information analysis server 3a is a server computer that receives the text data sent from the receipt printer 2a, and uses the received text data to execute a sales analysis process and electronic receipt issuing process.

In the sales analysis process, information such as the names, quantities, and prices of the purchased products, the store where the products were purchased, the date of sale, and the total purchase amount that is printed on the receipt are acquired from the text data, and used to analyze variations in sales based on the time of day, seasonal variations, and regional (location) variations, for example. Because essential information printed on the receipt is extracted from the text data in the electronic receipt issuing process, a screen showing the content of the requested receipt can be provided to the terminal device in response to user access from the terminal device.

Figure 7:
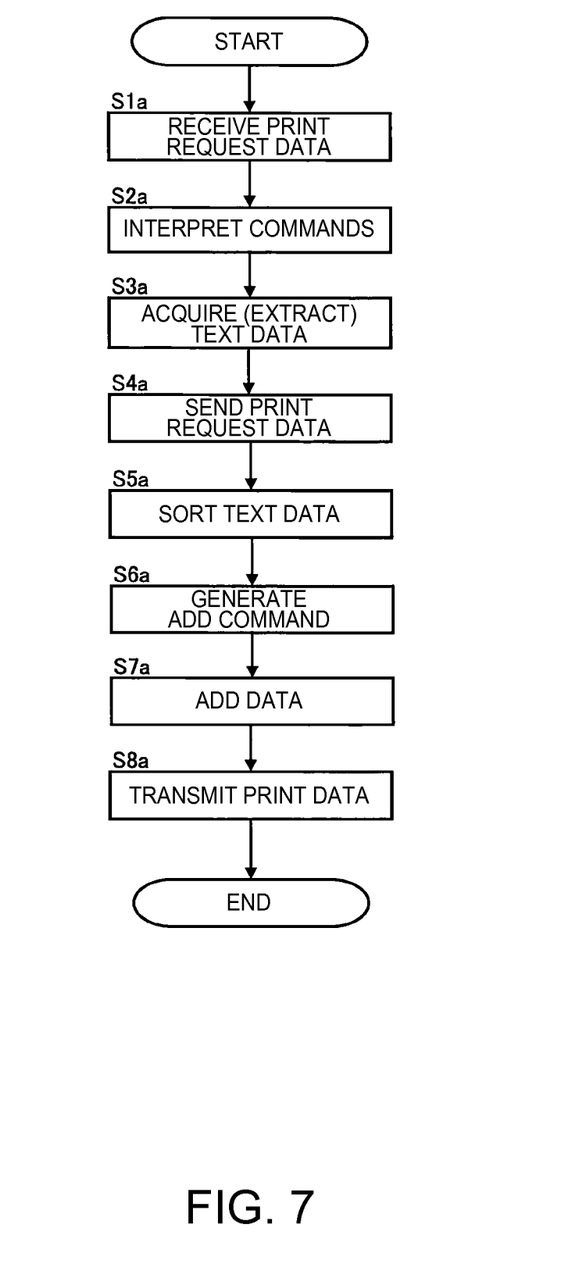

The processes described below are executed when printing a receipt is requested in the printing system according to this embodiment of the disclosure. FIG. 7 is a flow chart showing steps in the process executed by the filter driver unit 12a and command merging unit 14a. As described above, when printing a receipt is requested, print request data is output from the POS application unit 11a. The filter driver unit 12a then receives the print request data before the printer driver unit 13a (step S1a in FIG. 7).

As described above, the print request data is generated according to the GDI specification. Because GDI functions on the OS kernel layer are called when the print request data is passed to the printer driver unit 13a, the filter driver unit 12a captures the print request data where the GDI function is called.

The filter driver unit 12a then sequentially interprets the commands in the received print request data (step S2a in FIG. 7). Text expressing the store name and product names, numbers expressing numerical information such as prices, and images expressing a store logo, for example, are contained in the print objects of the receipt to be printed. If the object to be printed is text data containing alphanumeric characters, the filter driver unit 12a acquires (extracts) the text data and stores the acquired text data with information indicating the printing position in memory (step S3a in FIG. 7).

The filter driver unit 12a then sends the received print request data to the printer driver unit 13a (step S4a in FIG. 7).

The printer driver unit 13a interprets the transmitted print request data, rasterizes the print objects to be printed in the receipt, and generates print data using commands for the receipt printer 2a with the content to be printed as raster data. The resulting print data is then sent to the destination set in the printer driver unit 13a. The command merging unit 14a is previously set as the destination in this example.

Referring again to FIG. 7, the command merging unit 14a then reads the text data acquired and stored by the filter driver unit 12a, and sorts the text data (step S5a in FIG. 7). Because the print objects for text data contained in the print request data are not necessarily in the order in which they are printed, that is, are not necessarily in the top to bottom order of the receipt, the command merging unit 14a rearranges the acquired text data into the order in which it appears on the receipt in the reordering process.

More specifically, the command merging unit 14*a* sorts the text data representing the print objects into the order the objects appear on the receipt based on the printing position information in the print data. Yet more specifically, the command merging unit 14*a* first sorts the text data vertically starting from the top of the receipt to the bottom, and then sorts any objects at the same vertical (lengthwise) position from left to right on the receipt.

Next, the command merging unit 14*a* generates an add command to add the sorted text data to the generated print data (step S6*a* in FIG. 7). In this process, the command merging unit 14*a* generates an add command that adds the text data to the print data using the command language of the receipt printer 2*a* so that the print data can be understood (interpreted) by the print control unit 22*a* of the receipt printer 2*a* and the text data is not printed by the receipt printer 2*a*.

More specifically, in one example, this process of adding text data can be done using page mode commands. Because the print objects contained in the print data are normally expressed by raster data as described above, the receipt printer 2*a* prints the received raster data sequentially and does not store the data. However, in the page mode, the data for the print objects in a specific area (such as one page or one receipt) are stored (buffered) to memory in the receipt printer 2*a* and then used to print that area (page or receipt). The print objects also do not need to be expressed by raster data in the page mode, and may be text data. Also in the page mode, commands are written in the print data starting with a page mode registration command (start page mode command), followed by the data for the print objects, and commands for executing the printing process.

In this example, page mode commands are used to add a page mode registration command, the resorted text data acquired as described above, and a cancel command sequentially to the print data generated as described above.

Figure 8:
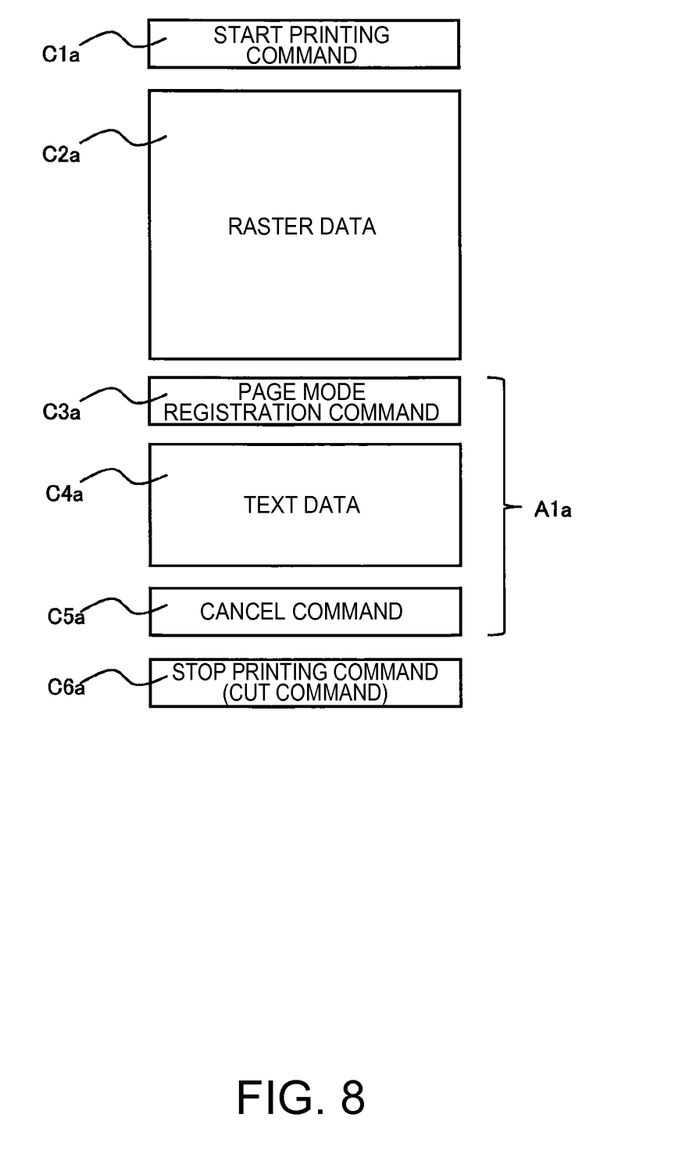
FIG. 8 conceptually illustrates the structure of print data in the second embodiment of the disclosure.

FIG. 8 conceptually illustrates the structure of the print data. FIG. 8 shows an example of the print data that is generated by the command merging unit 14*a* and sent to the receipt printer 2*a*, and is the data for one receipt. In FIG. 8, reference numeral C2*a* indicates the rasterized image data of the print content, and the start printing command C1*a* is the raster data header and includes the amount of raster data (the number of bytes). The end printing command C6*a* is a command instructing ending printing, and in this example is a cut command. These objects C1*a*, C2*a*, and C6*a* are print data generated by the printer driver unit 13*a*.

The block identified by reference numeral A1*a* in FIG. 8 is the part of the add command generated by the command merging unit 14*a*, and as described above includes the page mode registration command (C3*a*), the sorted text data (C4*a*), and the cancel command (C5*a*).

Note that other commands may be used to add text data. In a second example, text data may be added using text data of a character count not exceeding the printing width, and a clear command, in the text mode. More specifically, the command merging unit 14*a* first prepares a start text mode command. Next, the command merging unit 14*a* determines the number of characters can fit on one line within the printing width, sequentially extracts and adds this number of characters of text data from the resorted text data to the start text mode command, and then adds a clear command. This number of characters of text data and clear commands are repeatedly added until there is no more text data. The add command is the data from the generated start text mode command to the clear command at the end.

When an add command is generated in this way, the command merging unit 14*a* executes a process to add the add command to the print data generated by the printer driver unit 13*a* (step S7*a* in FIG. 7). More specifically, as described above, because the destination of print data from the printer driver unit 13*a* is set to the command merging unit 14*a*, the command merging unit 14*a* receives the print data sent from the printer driver unit 13*a*, and inserts (merges) the generated add command to the specific position in the received print data.

The command merging unit 14*a* inserts the add command to the place indicated by reference numeral A1*a* in FIG. 8 when the add command is generated using a page mode command, and likewise adds the add command to the place indicated by reference numeral A1*a* in FIG. 8 when the add command is generated using a text mode command.

When this addition process ends, the command merging unit 14*a* sends the print data resulting from the add process to the receipt printer 2*a* (step S8*a* in FIG. 7).

This completes processing in the POS terminal 1*a*.

Figure 9:
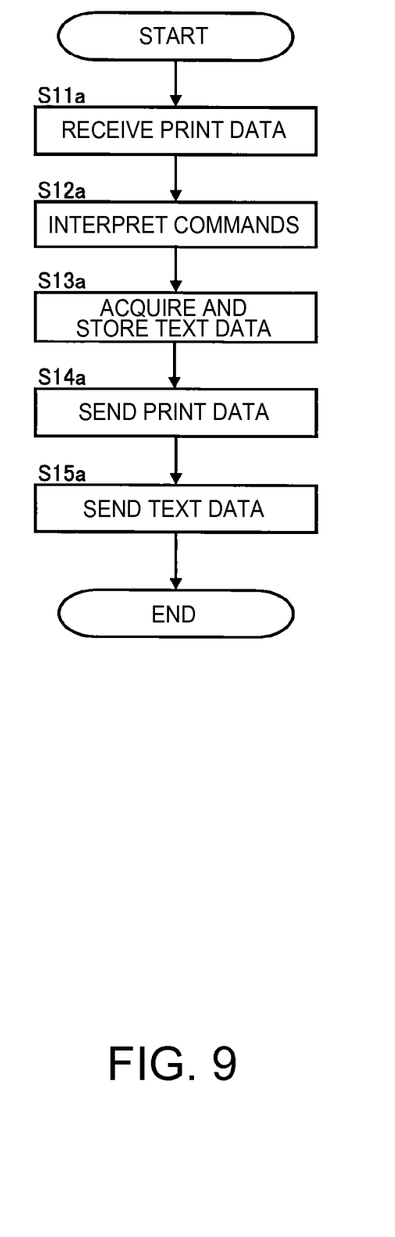

The process executed by the text data processing unit 21*a* of the receipt printer 2*a* is described next. FIG. 9 is a flow chart showing steps in the process executed by the text data processing unit 21*a*.

The text data processing unit 21*a* first receives the print data sent from the command merging unit 14*a* (step S11*a* in FIG. 9), and sequentially interprets the commands contained in the print data (step S12*a* in FIG. 9).

If the text data processing unit 21*a* determines by this process that there is no text data, it outputs the print data directly to the print control unit 22*a* (step S14*a* in FIG. 9). However, if there is text data, the text data processing unit 21*a* acquires and stores the text data in memory (step S13*a* in FIG. 9), and then sends that portion of print data to the print control unit 22*a* (step S14*a* in FIG. 9).

Using the example of print data shown in FIG. 8, the text data in block C4*a* is acquired and stored, and all of the print data (C1*a* to C6*a*) is sent to the print control unit 22*a*.

In the above example that uses a text mode and adds a specific number of text data objects and clear commands, the text data portion is extracted and stored, and all of the print data is sent to the print control unit 22*a*.

Alternatively, after acquiring and storing the text data, the text data processing unit 21*a* may delete the text data portion from the print data, and then send the remaining print data to the print control unit 22*a*. In this event, the portion added by the adding process is deleted.

When acquiring and storing the text data (S13*a*) and sending the received print data (S14*a*) are completed, the text data processing unit 21*a* sends the stored text data to the sales information analysis server 3*a* (step S15*a* in FIG. 9). To send the data, the text data processing unit 21*a* may first convert the stored text data to markup language (such as XML (Extensible Markup Language)) before sending the data. The data may also be sent to the sales information analysis server 3*a* at the necessary frequency, such as every time a receipt is printed or in daily or weekly units.

Because the sales information printed on the receipts is included in the transmitted text data, the sales information analysis server 3*a* can execute processes to analyze the information or issue electronic receipts.

This completes processing by the text data processing unit 21*a*.

Figure 10:
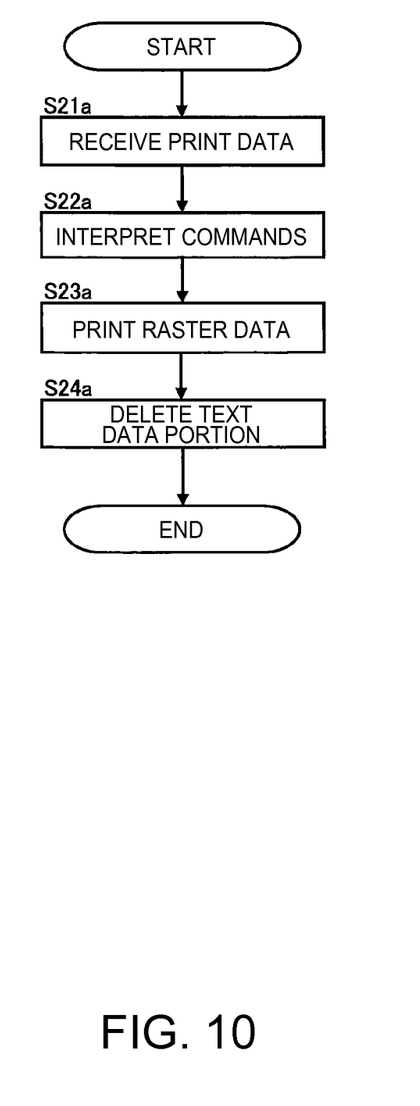

The process executed by the print control unit 22*a* and print mechanism unit 23*a* is described next. FIG. 10 is a flow chart showing steps in the process executed by the print control unit 22*a* and print mechanism unit 23*a*.

The print data transmitted from the text data processing unit 21a is first received by the print control unit 22a (step S21a in FIG. 10), and the print control unit 22a then sequentially interprets the commands contained in the received print data (step S22a in FIG. 10).

The print control unit 22a controls the print mechanism unit 23a according to the interpreted commands, and controls the print mechanism unit 23a to print on the paper (step S23a in FIG. 10). As described above, the print control unit 22a sequentially passes the received raster data to the print mechanism unit 23a for printing based on the raster data.

The text data that was added by the text data adding step is then deleted by the command following the text data, and is not printed by the print mechanism unit 23a (step S24a in FIG. 10).

In the print data shown in FIG. 8, printing proceeds through the raster data C2a, and the text data C4a is deleted from memory by the cancel command in C5a and is not printed.

In the above example that adds a specific amount of text data and a clear command using a text mode, the specific amount of text data is deleted by the immediately following clear command and is not printed.

Only the portion that should be printed as a receipt is therefore printed, and the data that is added for acquiring the sales information is not printed. When the added text data is deleted by the text data processing unit 21a, only the portion that should be printed as a receipt is printed.

Processing by the print control unit 22a and print mechanism unit 23a thus ends.

Because the text portion added to the print data by the adding process described above is expressed by commands that can be interpreted by the receipt printer 2a and is processed without affecting the printing process, the receipt printer 2a can print receipts without throwing an error even if the receipt printer 2a is not a so-called intelligent printer and does not have the portion corresponding to the text data processing unit 21a.

As described above, text data for the text portion of the print objects is added to the print data by functions of the filter driver unit 12a and command merging unit 14a in the printing system according to this embodiment even if the POS application unit 11a and printer driver unit 13a process conventional print requests and print commands. Modifying the existing POS application and printer driver is therefore not necessary, and functionality can be added while not changing the appearance of the printout, when adding functions for adding text data and text data analysis to an existing system.

Furthermore, when the printer driver of an existing system sends the print content as raster data to the printer, there is also no concern about the printouts of the existing system changing when adding the functions described above because there is no need to change existing processes to add new functionality.

Furthermore, because text data is added to the print data, the information printed on a receipt can be easily extracted on the printer side.

Furthermore, because the printer driver unit 12 acquires the text data to add to the print data before rasterizing the print objects, processing is simple and the printed information can be accurately acquired.

Furthermore, because the command merging unit 14a adds the text data after first sorting it to the order printed on the receipt, the text data can be easily used by the sales information analysis server 3a or other device.

Furthermore, because the command merging unit 14a uses commands in the language of the receipt printer 2a to incorporate text data in the print data, the data can be easily interpreted on the receipt printer 2a side and the print control unit 22a will not throw an error.

A POS system is used as an example in the embodiment described above, but the disclosure is not so limited to use in POS systems. For example, the disclosure can be used in systems that execute a specific application including producing printouts from a printer, such as systems used in hospitals and package delivery companies, and is particularly effective when modifying the existing application program is difficult.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A host device comprising:
an acquisitor that receives print request data, acquires text data to be printed from the print request data, and sends the print request data to a printer driver;
the printer driver that rasterizes print content and generates print data using a printer command based on the print request data; and
a merging part that receives the print data that the printer driver outputs based on the print request data, adds the acquired text data to the print data using the command, and sends the print data with the added text data to the printer.

2. The host device described in claim 1, wherein:
print content is expressed by raster data in the print data that the printer driver outputs.

3. The host device described in claim 1, wherein:
the merging part executes a process of sorting the acquired text data into the order the text data appears when printed before adding the text data to the print data.

4. The host device described in claim 1, wherein:
the merging part adds the acquired text data to the print data by inserting the text data between a registration command setting a page mode in which the printer buffers the print data for a specific printing area before executing a printing process based on the buffered print data, and a cancel command that cancels printing in the page mode.

5. The host device described in claim 1, wherein:
the merging part adds text data to the print data using a start command for a text mode that sends the print data to the printer as text data, and a specific number of characters of text data followed by a clear command.

6. A printing system comprising a printer and a host device of the printer,
the host device including an acquisitor that receives print request data, acquires text data to be printed from the print request data, and sends the print request data to a printer driver,
the printer driver that rasterizes print content and generates print data using a printer command based on the print request data, and
a merging part that receives the print data that the printer driver outputs based on the print request data, adds the acquired text data to the print data using the command, and sends the print data with the added text data to the printer; and the printer including a text data processor that acquires the added text data from the transmitted print data, and a print mechanism that executes a printing process based on the print data.

7. The printing system described in claim 6, wherein:

the text data processor of the printer acquires the added text data from the transmitted print data, and the print mechanism of the printer executes the printing process based on the print data.

8. The printing system described in claim 6, wherein:

the text data processor stores the acquired text data, and sends the text data at a specific time to another device.

9. The printing system described in claim 6, wherein:

print content is expressed by raster data in the print data output by the printer driver.

10. The printing system described in claim 6, wherein:

the merging part of the host device sorts the acquired text data into the order the text data appears when printed, and adds the sorted text data to the print data.

11. The printing system described in claim 6, wherein:

the merging part of the host device adds the acquired text data to the print data by inserting the text data between a registration command setting a page mode in which the printer buffers the print data for a specific printing area before executing the printing process based on the buffered print data, and a cancel command that cancels printing in the page mode.

12. The printing system described in claim 6, wherein:

the merging part of the host device adds text data to the print data using a start command for a text mode that sends the print data to the printer as text data, and a specific number of characters of text data followed by a clear command.

13. A data processing method of a host device, comprising:

an acquisition step of receiving print request data, acquiring text data to be printed from print request data, and sending the print request data;

a print data generating step of rasterizing print content and generating print data using a command for a printer based on the print request data;

an adding step of receiving the print data based on the print request data, adding the acquired text data to the print data using the command; and a transmission step of sending the print data with added text data to the printer.

14. The data processing method described in claim 13, wherein:

print content is expressed by raster data in the print data that the printer driver outputs.

15. The data processing method described in claim 13, wherein:

the adding step sorts the text data into the order the text data appears when printed before adding the text data to the print data.

16. The data processing method described in claim 13, wherein:

the adding step adds the acquired text data to the print data by inserting the text data between a registration command setting a page mode in which the printer buffers the print data for a specific printing area before executing a printing process based on the buffered print data, and a cancel command that cancels printing in the page mode.

17. The data processing method described in claim 13, wherein:

the adding step adds text data to the print data using a start command for a text mode that sends the print data to the printer as text data, and a specific number of characters of text data followed by a clear command.

\* \* \* \* \*